RUSH D. BAKER.

Improved Ladle for Canning Fruit, etc.

117,723.

Patented August 8, 1871.

Witnesses.
A. Allgiear
Mathew Staub

Inventor.
Rush D. Baker
per. F. A. Morley
Atty.

AM. PHOTO-LITHOGRAPHIC CO. N.Y. (OSBORNE'S PROCESS.)

UNITED STATES PATENT OFFICE.

RUSH D. BAKER, OF SYRACUSE, NEW YORK.

IMPROVEMENT IN LADLES FOR CANNING FRUITS.

Specification forming part of Letters Patent No. 117,723, dated August 8, 1871.

*To all whom it may concern:*

Be it known that I, RUSH D. BAKER, of Syracuse, in the county of Onondaga and State of New York, have invented a new and Improved Ladle for Canning Fruit, &c.; and I do hereby declare that the following is a full, clear, and exact description thereof, which will enable others to make and use the same, reference being had to the accompanying drawing forming part of this specification, in which—

Figure 1:
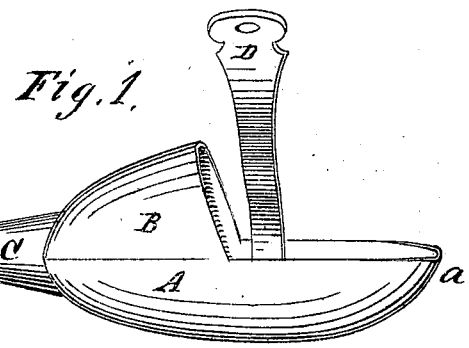
Figure 2:
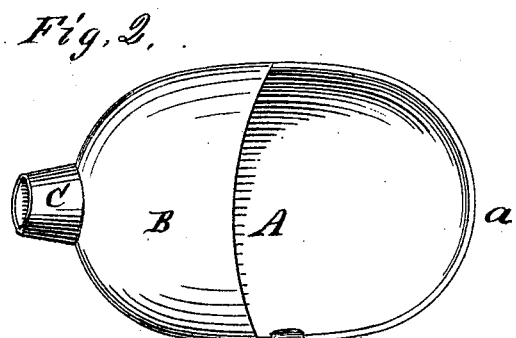
Figure 3:
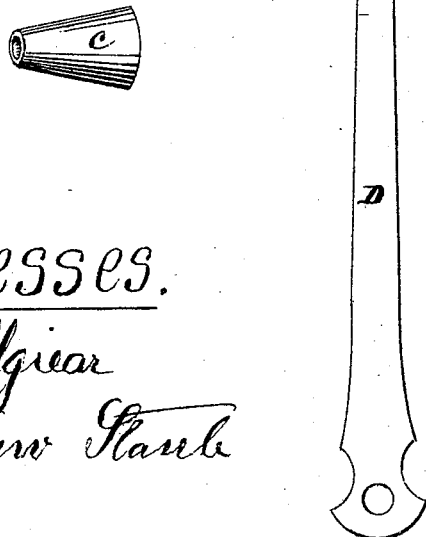

Figure 1 is a side view of my invention, and Fig. 2 is a top or plan view. Fig. 3 is a detail view.

Similar letters of reference indicate like parts in the several figures.

This ladle is designed chiefly for canning fruit, and one side of it has a cover or hood, which with that side of the ladle forms a kind of tunnel that terminates in a spout, so that, in canning peaches, pears, and other fruit, the fruit is guided more readily with the fluid thereof from the ladle into the cans or jars, as hereinafter more fully explained.

In the accompanying drawing, A is the body of the ladle, B is the hood, C the spout, and D the handle. The hood B and nozzle C form that side of the ladle into a tunnel to guide the delivery of its contents, while the opposite side or lip $a$ of the ladle is dipped into the fruit for refilling the ladle. For reducing the size of the discharge an extra nozzle, $c$, Fig. 3, is provided and made to fit snugly on the main nozzle C, and when pressed on remains fixed thereon with sufficient security for use, and this secondary or adjustable nozzle is made with a smaller discharge, as shown, so that the capacity of the discharge can be regulated for smaller cans or for cans having smaller throats.

By the use of this ladle the operative can see into the cans to better advantage as they are being filled, and the operation is carried on more expeditiously and with less waste than usually. The ladle can be used for other purposes where it is desirable to have a tunnel in connection with the ladle or dipping part.

Having thus described my invention, what I claim and desire to secure by Letters Patent, is—

The dipper or ladle A, having one open side or dipping-lip, $a$, with a tunnel or guide, B C, and handle D, as constructed.

The above specification of my invention signed by me this 3d day of July, 1871.

RUSH D. BAKER.

Witnesses:
A. ALLGIEAR,
F. A. MORLEY.